United States Patent [19]
Tran et al.

[11] Patent Number: 6,134,070
[45] Date of Patent: *Oct. 17, 2000

[54] ENCODED SERVO TRACK CONFIGURATIONS, SERVO WRITER AND SYSTEMS/METHOD REGARDING SAME

[75] Inventors: Hung T. Tran; Theodore A. Schwarz, both of Woodbury; Robert J. Youngquist, White Bear Lake; Alan R. Olson, Cottage Grove; Richard W. Molstad, St. Paul; Gary D. Moeller, Maplewood; Richard E. Jewett, Minneapolis; Christopher L. Hill, Woodbury, all of Minn.

[73] Assignee: Imation Corp., Oakdale, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/861,664

[22] Filed: May 22, 1997

[51] Int. Cl.[7] ..................................... G11B 21/02
[52] U.S. Cl. ........................... 360/75; 360/77.12; 360/49
[58] Field of Search ............... 360/77.12, 78.05, 360/118, 119, 121, 75, 49

[56] References Cited

U.S. PATENT DOCUMENTS

| | | | |
|---|---|---|---|
| 4,472,750 | 9/1984 | Klumpp et al. | 360/78.05 |
| 4,558,380 | 12/1985 | Porter et al. . | |
| 5,396,376 | 3/1995 | Chambors et al. | 360/48 |
| 5,408,368 | 4/1995 | Hallamasek | 360/72.2 |
| 5,426,543 | 6/1995 | Dy et al. | 360/77.12 |
| 5,432,652 | 7/1995 | Comeaux et al. | 360/77.12 |
| 5,568,327 | 10/1996 | Pahr et al. . | |
| 5,602,703 | 2/1997 | Moore et al. | 360/121 |
| 5,689,384 | 11/1997 | Albrecht et al. . | |
| 5,946,156 | 8/1999 | Schwart et al. | 360/75 |

FOREIGN PATENT DOCUMENTS

| | | |
|---|---|---|
| 0 456 316 | 11/1991 | European Pat. Off. . |
| 61-280087 | 12/1986 | Japan . |
| 63-285702 | 11/1988 | Japan . |
| 2-198067 | 8/1990 | Japan . |
| 6-309799 | 11/1994 | Japan . |

*Primary Examiner*—Andrew L. Sniezek
*Assistant Examiner*—K. Wong
*Attorney, Agent, or Firm*—Eric D. Levinson

[57] ABSTRACT

A servo track recording tape includes a plurality of data tracks and a servo band dedicated for servo information. The servo band includes substantially uniformly written servo carrier information across a predetermined servo carrier width along the length of the tape with at least one encoded track pitch defined therein. Each encoded track pitch has alternating erased and non-erased portions along the length of the tape for defining servo tracks. The alternating erased and non-erased portions of the at least one encoded track pitch include encoded information provided by varying the length of one or more of the erased portions. The encoded information may be representative of tape locations along the length of the tape. The servo band may include two or more encoded track pitches defined in the substantially uniformly written servo carrier information with each encoded track pitch defining corresponding servo tracks. The alternating erased and non-erased portions of each of the two or more encoded track pitches may include encoded information uniquely identifying the corresponding servo tracks. Another servo tracking data recording tape includes a servo band including at least one single frequency servo track written in an erased width of the servo band along the length of the tape. The single frequency servo track includes encoded blocks of information along the length of the tape representative of at least one characteristic of the tape. Systems, head assemblies and encoding methods for use in providing such encoded servo track recording tape configurations are also described.

29 Claims, 10 Drawing Sheets

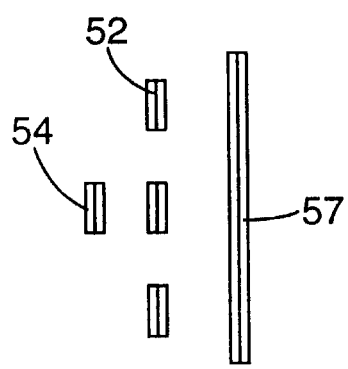 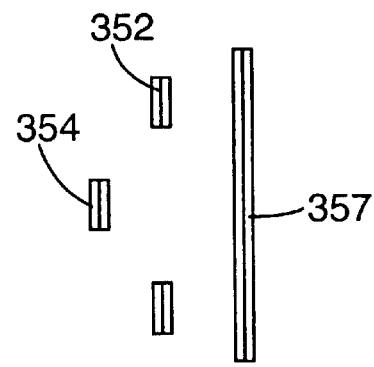
Fig. 8A  Fig. 8B
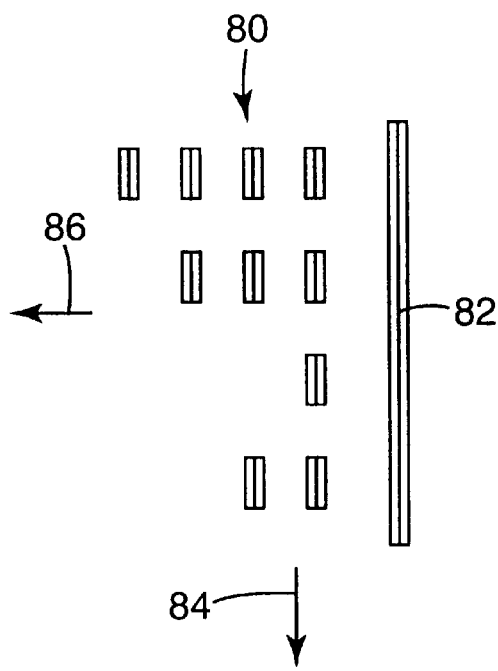 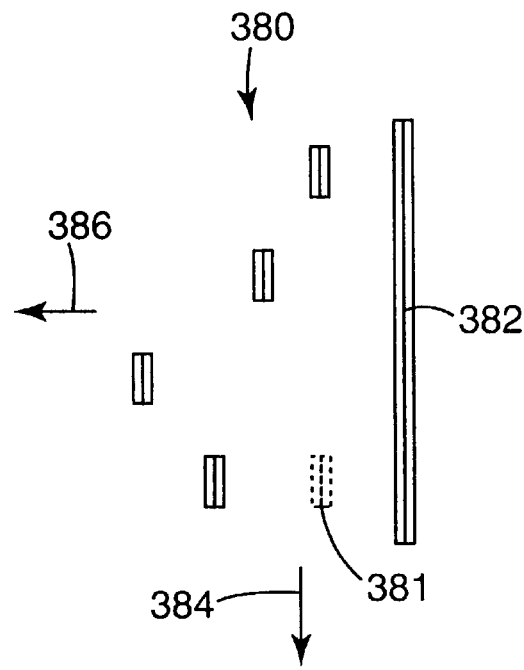
Fig. 9A  Fig. 9B

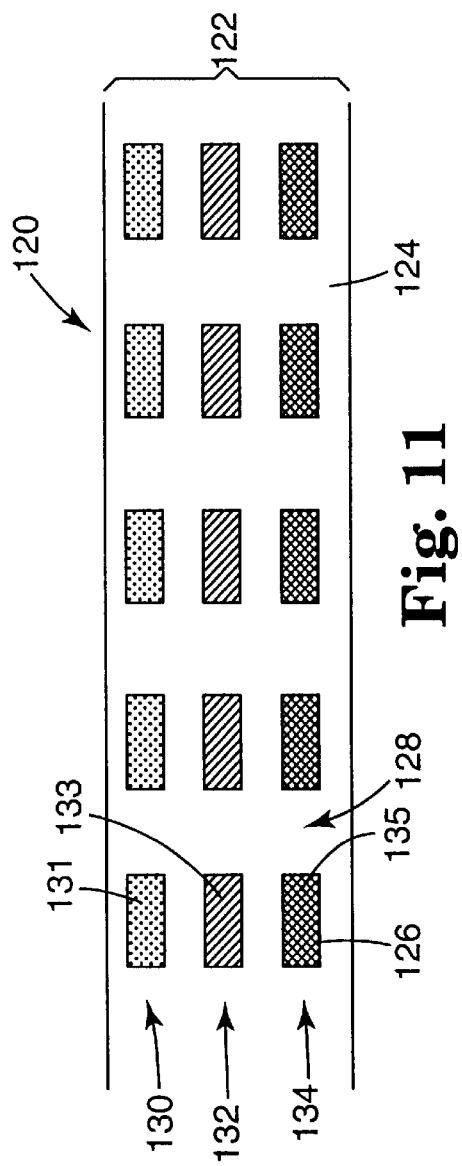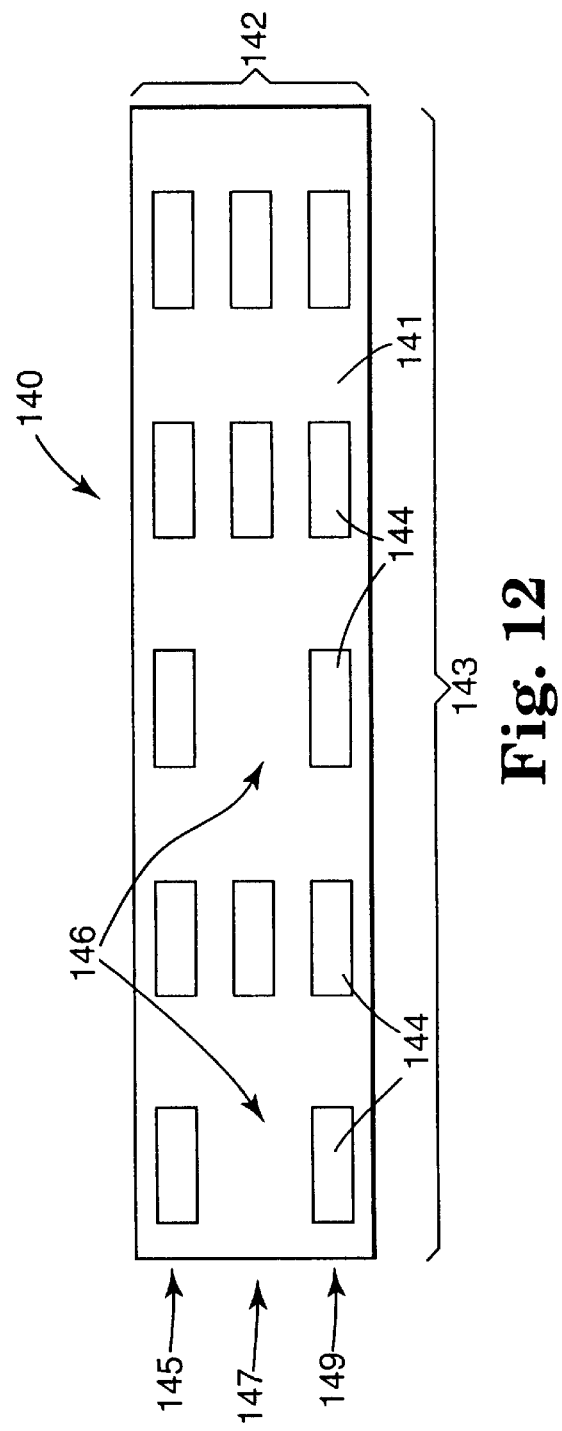

ENCODED SERVO TRACK CONFIGURATIONS, SERVO WRITER AND SYSTEMS/METHOD REGARDING SAME

FIELD OF THE INVENTION

The present invention relates generally to tape servo tracking. More particularly, the present invention pertains to the encoding of servo tracks with information.

BACKGROUND OF THE INVENTION

It is common to provide magnetic tape write/read head assemblies having one or more write/read transducer elements positioned transverse to the intended path of a magnetic recording medium, e.g., tape, for writing data on and reading data from parallel tracks on the tape. It is also known to include servo information on at least some of the tracks and provide servo transducer elements on the recording/playback head for reading such information to enable control of the lateral position of the head assembly, thereby dynamically maintaining the respective transducer elements of the head assembly relative to tape tracks. With the use of servo control, data track widths can be made significantly narrower and the data capacity of the recording medium can therefore be increased.

Various techniques for providing servo tracks have been previously employed. For example, it is known to provide dedicated servo tracks on the medium at the time of manufacture. However, it is often desirable to enable an end user to write a servo pattern on the medium in the field as opposed to factory writing of servo information. This allows the end user to add the servo information to either a blank medium or utilize a medium which was either intentionally or unintentionally erased.

There are a substantial number of different servo track configurations for providing servo control. For example, one continuous track following single frequency system and servo track configuration is generally characterized by the utilization of erased and non-erased portions in a servo carrier band to provide servo tracks for servo control as described in U.S. Pat. No. 5,229,895 to Schwarz et al., entitled "Multi-Track Servo Recording Head Assembly." As described therein, a write element is used to write a servo carrier signal extending substantially uniformly over a dedicated servo section along a length of the tape followed by erasing various portions of the written servo section to define one or more servo track pairs along the length of the tape. One or more servo read elements may be used to read servo information from the servo tracks for generation of a position signal for control of the head assembly position relative to the tape.

Another continuous track following single frequency system and servo track configuration is generally characterized by the utilization of noncontiguous servo tracks, i.e., separated servo tracks of single frequency, in an erased servo section as described in U.S. Pat. No. 5,262,908 to Iwamatsu et al., entitled "Tracking Control Device For Magnetic Recording/Reproducing Apparatus" (particularly, FIG. 4A). As described therein, the servo information is read from a servo track by at least one pair of servo read heads, e.g., a position signal is generated from the position of the servo read heads relative to the servo track.

However, the different single frequency systems and servo track configurations have ambiguity associated with identifying which servo track is being used for deriving the position signal to provide for servo control of the system. In other words, a track following magnetic head assembly using these single frequency servo systems cannot distinguish between servo tracks being read. For example, when servo track pairs are defined such as by erased and non-erased portions, the system cannot distinguish which servo track pair is being read. Although the servo track provides adequate positioning information, it does not provide information as to which servo track the servo head is currently utilizing to generate the position signal for servo control. Therefore, if the servo head is unintentionally repositioned, a misidentification of the servo track being used for servo positioning of the data read/write elements occurs. Such unintentional head displacement is exacerbated as advanced tape drives utilize decreased track widths and decreased track pitch.

Various systems include techniques for attaining some improvement with respect to the ambiguity in servo track identification. For example, sophisticated software algorithms for identifying which servo track is being read have been used. Such algorithms generally provide for identification by repositioning the head below or above a servo track group and counting servo track crossings to reach the proper servo track. Other methods, for example, use a gross position transducer, external to the head, such as an optical line counter or read information recorded on data tracks to confirm servo track position.

Further, additional techniques such as writing servo track identification frames at the beginning of tape (BOT) and end of tape (EOT) in order to identify the correct servo track when the magnetic head loses servo lock in the case of, for example, a sudden head displacement, have also been used. In such a servo configuration, the drive must undesirably return to the BOT or EOT to read the identification frames and thereby determine accurate servo track position, i.e., servo track identification.

In addition, other systems, using servo track configurations including distinguishable servo tracks, i.e., such as servo tracks provided by writing adjacent tracks at different frequencies, have been used to alleviate ambiguity with respect to servo track identification. However, such configurations have the disadvantage of increasing the cost of the servo head and read circuit electronics because of the different frequencies utilized. Such system configurations also have the increased difficulty of producing a servo write head with different carrier frequencies for adjacent tracks while maintaining the necessary track pitch and track widths. For precision writing, this typically requires that the pattern be written in the factory.

Furthermore, in addition to problems of ambiguity with respect to the identification of servo tracks, it is desirable to know other information regarding the tape data cartridge or tape of the cartridge as the tape is being accessed. For example, it is desirable to know longitudinal tape locations when searching at high speed without slowing the drive down to read the actual data and format signals while simultaneously using sophisticated software algorithms to keep track of servo track locations. In a typical data cartridge system, longitudinal tape locations may be approximated by timing at a known speed, or by periodically reading header information in recorded data tracks and calculating longitudinal tape locations. This limits the accuracy and speed of such systems in determining particular locations on the tape.

For the above reasons and other reasons that will be apparent from the description below, alternatives to the configurations such as those described above are needed to overcome difficulties associated therewith. For example, the identification of servo tracks is desired. Further, it is desirable to provide information regarding various tape characteristics, for example, tape locations, BOT indicators, load indicators, etc.

SUMMARY OF THE INVENTION

The encoding of servo tracks in accordance with the present invention provides the solution to the problems described above. Various tape servo track configurations, encoding methods, servo writers and other systems regarding such encoding of the servo tracks are summarized below.

A servo track recording tape in accordance with the present invention includes a plurality of bands of tracks. The plurality of bands of tracks include at least one data band having a plurality of data tracks and a servo band dedicated for servo information. The servo band includes substantially uniformly written servo information across a predetermined servo carrier width along the length of the tape with at least one encoded track pitch defined therein. Each encoded track pitch has alternating erased and non-erased portions along the length of the tape for defining at least one servo track. The alternating erased and non-erased portions of the at least one encoded track pitch include encoded information representative of at least one characteristic of the tape. The encoded information is provided by varying the length of one or more of the erased portions.

In one embodiment of the tape, the alternating erased and non-erased portions include encoded information representative of tape locations along the length of the tape. Further, in accordance with this embodiment, the length of a plurality of the erased portions in the at least one encoded track pitch is varied along the length of the tape to represent unique location codes representative of the tape locations along the length of the tape. Yet further, at least one pair of servo tracks are defined by the at least one encoded track pitch which is encoded by the varied lengths of the erased portions representing the unique location codes.

In another embodiment of the tape in accordance with the present invention, the servo band includes two or more encoded track pitches defined in the substantially uniformly written servo information. Each encoded track pitch defines a corresponding pair of servo tracks. The alternating erased and non-erased portions of each of the two or more encoded track pitches include encoded information uniquely identifying each corresponding pair of servo tracks. Further in accordance with this embodiment, the two or more encoded track pitches are transversely encoded by varying the length of one or more of the erased portions in one of the two or more encoded track pitches relative to the length of one or more of the erased portions of another of the two or more encoded track pitches to uniquely identify each pair of servo tracks with a unique identification code.

A system for writing servo track information within a servo band of a tape is also described. The system includes a servo write transducer along a first gap line for writing a servo carrier signal extending substantially uniformly over a servo carrier width of a servo band of a tape. At least one servo erase element of predetermined width along a second gap line erases portions of the servo carrier signal to provide alternating erased portions and non-erased portions along an encoded track pitch within the servo carrier width along the length of the tape to define at least one servo track extending along the length of the tape within the servo carrier width. The at least one servo erase element is controlled to vary the length of the erased portions to provide encoded information representative of at least one characteristic of the tape.

In one embodiment of the system, the at least one servo erase element is controlled for varying the length of the erased portions along the length of the tape for providing encoded information representative of tape locations along the length of the tape.

In another embodiment of the system, the system includes one or more additional servo erase elements of predetermined width along a third gap line for erasing additional portions of the servo carrier signal to provide alternating erased portions and non-erased portions along an additional encoded track pitch generally parallel to the encoded track pitch including the alternating erased portions and non-erased portions erased by the at least one servo erase element along the second gap line. The one or more additional servo erase elements along the third gap line are controlled to vary the length of the erased portions relative to the erased portions erased by the at least one servo erase element along the second gap line so as to provide encoded information uniquely identifying the encoded track pitches.

In another embodiment of the system, the system includes two or more servo erase elements separated along the second gap line. Each of the two or more servo erase elements erase portions of the servo carrier signal to provide alternating erased portions and non-erased portions along corresponding and generally parallel encoded track pitches within the servo carrier width along the length of the tape. The system further includes one or more additional servo erase elements along a third gap line. The one or more additional servo erase elements are controlled so as to provide an additional erased portion extending from one or more of the erased portions along the corresponding paths within the servo carrier width so as vary the length of the erased portions of the corresponding paths to provide encoded information uniquely identifying each of the encoded track pitches.

An encoding method for use in a servo tracking system in accordance with the present invention includes providing a tape comprising a plurality of bands of tracks. The plurality of bands of tracks include at least one data band having a plurality of data tracks and a servo band dedicated for servo information. Servo carrier information is substantially uniformly written across a predetermined servo carrier width along the length of the tape. Portions of the servo carrier information written across the predetermined servo carrier width in at least one encoded track pitch within the servo carrier width are erased resulting in alternating erased and non-erased portions along the length of the tape defining at least one servo track pair. The servo tracks are encoded with information representative of at least one characteristic of the tape by varying the length of one or more of the erased portions of the at least one encoded track pitch.

In one embodiment of the method, the erasing step includes erasing portions of the servo carrier information written across the predetermined servo carrier width in two or more encoded track pitches within the servo carrier width resulting in alternating erased and non-erased portions along the length of the tape defining at least two servo track pairs. One or more of the erased portions of the two or more encoded track pitches are varied in length so as to uniquely identify the at least two servo tracks pairs.

In another embodiment of the method, the varied lengths of the erased portions include encoded information representative of tape locations along the length of the tape.

A head assembly in accordance with the present invention includes a servo write element along a first gap line for writing a servo carrier signal extending substantially uniformly over a servo carrier width of a servo band of a tape and one or more servo erase elements lying along a second gap line. Each servo erase element erases portions of the servo carrier signal to provide alternating erased portions and non-erased portions along a corresponding encoded track pitch within the servo carrier width along the length of the tape. One or more of the erased portions have a first length. The assembly further includes one or more additional servo erase elements lying along one or more additional gap lines. Each additional servo erase element is for erasing additional portions of the servo carrier signal to provide alternating erased portions and non-erased portions along a corresponding encoded track pitch generally parallel to the corresponding encoded track pitches erased using the servo erase elements lying along the second gap line. One or more of the erased additional portions have a second length that is different from the first length.

Another head assembly in accordance with the present invention includes a servo write element along a first gap line for writing a servo carrier signal extending substantially uniformly over a servo carrier width of a servo band of a tape and a plurality of servo erase elements (N) separated along a second gap line. Each of the servo erase elements is for erasing portions of the servo carrier signal to provide alternating erased portions and non-erased portions along a corresponding encoded track pitch within the servo carrier width along the length of the tape. The head assembly further includes one or more additional servo erase elements of a number<N along one or more additional gap lines. At least one of the additional servo erase elements has a path that coincides with at least one of the corresponding encoded track pitches corresponding to one servo erase element of the plurality of servo erase elements along the second gap line to provide an additional erased portion extending from one or more of the erased portions along the corresponding encoded track pitch within the servo carrier width to vary the length of the one or more erased portions.

Another servo tracking data recording tape in accordance with the present invention is also described. The tape includes a plurality of bands of tracks with the plurality of bands of tracks including at least one data band having a plurality of data tracks and a servo band dedicated for servo information. The servo band includes at least one single frequency servo track written in an erased width of the servo band along the length of the tape. The at least one single frequency servo track including encoded blocks of information along the length of the tape representative of at least one characteristic of the tape.

In one embodiment of the tape, the encoded blocks include portions therein modulated in phase. In another embodiment of the tape, the encoded blocks include portions therein modulated in frequency. In yet another embodiment of the tape, the servo band includes two or more single frequency servo tracks and the encoded blocks of information of the two or more single frequency servo tracks include encoded information uniquely identifying the two or more servo tracks. Further, in an embodiment of the tape, the servo tracks include encoded information representative of tape locations along the length of the tape.

Another encoding method for use in a servo tracking system includes providing a tape comprising a plurality of bands of tracks with the plurality of bands of tracks including at least one data band having a plurality of data tracks and a servo band dedicated for servo information. An erased servo width across the servo band and along the length of the tape is provided. At least one single frequency servo track is written within the erased servo band. The servo track is encoded with blocks of information along the length of the tape representative of at least one characteristic of the tape, e.g., tape locations, servo track identification information, etc.

BRIEF DESCRIPTION OF THE DRAWINGS

FIG. 8A is an illustration of servo writer elements utilized for writing and encoding servo tracks within the servo band such as shown in FIG. 6; the servo writer elements being the same as those shown in FIG. 7.

FIG. 8B is an alternative servo writer element configuration for writing and encoding servo tracks within the servo band such as shown in FIG. 6.

FIGS. 9A and 9B are generalized diagrams of servo writer elements which may be utilized for writing and encoding servo tracks in a servo band in accordance with the present invention.

FIG. 11 is an illustration of a servo band including servo tracks encoded using an alternative technique for encoding information regarding servo track identification.

FIG. 12 is an illustration of a servo band including servo tracks encoded using a further alternative technique for encoding information regarding servo track identification.

DETAILED DESCRIPTION OF THE EMBODIMENTS

The present invention shall be described with reference to FIGS. 1–17. First, the present invention shall be described with respect to servo tracks provided through the erasure of portions of a substantially uniformly written servo carrier signal in a servo band. Thereafter, the present invention shall be described with respect to servo tracks provided by writing single frequency separated servo tracks within an erased servo band. In both circumstances, the present invention contemplates the encoding of the servo tracks with information representative of various characteristics of the tape upon which the servo tracks are written.

For example, the present invention provides an easy, less costly and more reliable manner for the drive to achieve positive identification of servo tracks with reduced ambiguity and even without ambiguity. Such positive identification can be provided continuously while reading the servo tracks in the servo band during data writing and reading operations. Unambiguous servo track identification provides for improved performance of the drive in the case of loss of servo lock on a specific servo track for any reason, e.g., a sudden displacement of the head relative to the tape. In addition, the present invention provides for encoding the servo tracks with information so as to allow for identifying tape locations using the encoded information as the drive is searching and locating tracks for data read/write functions.

Contemplated in accordance with the present invention is the encoding of the servo tracks in a longitudinal manner along the length of the tape and in a transverse manner across the width of the tape. However, encoding of the servo tracks may take various other forms as described further herein.

Figure 1:
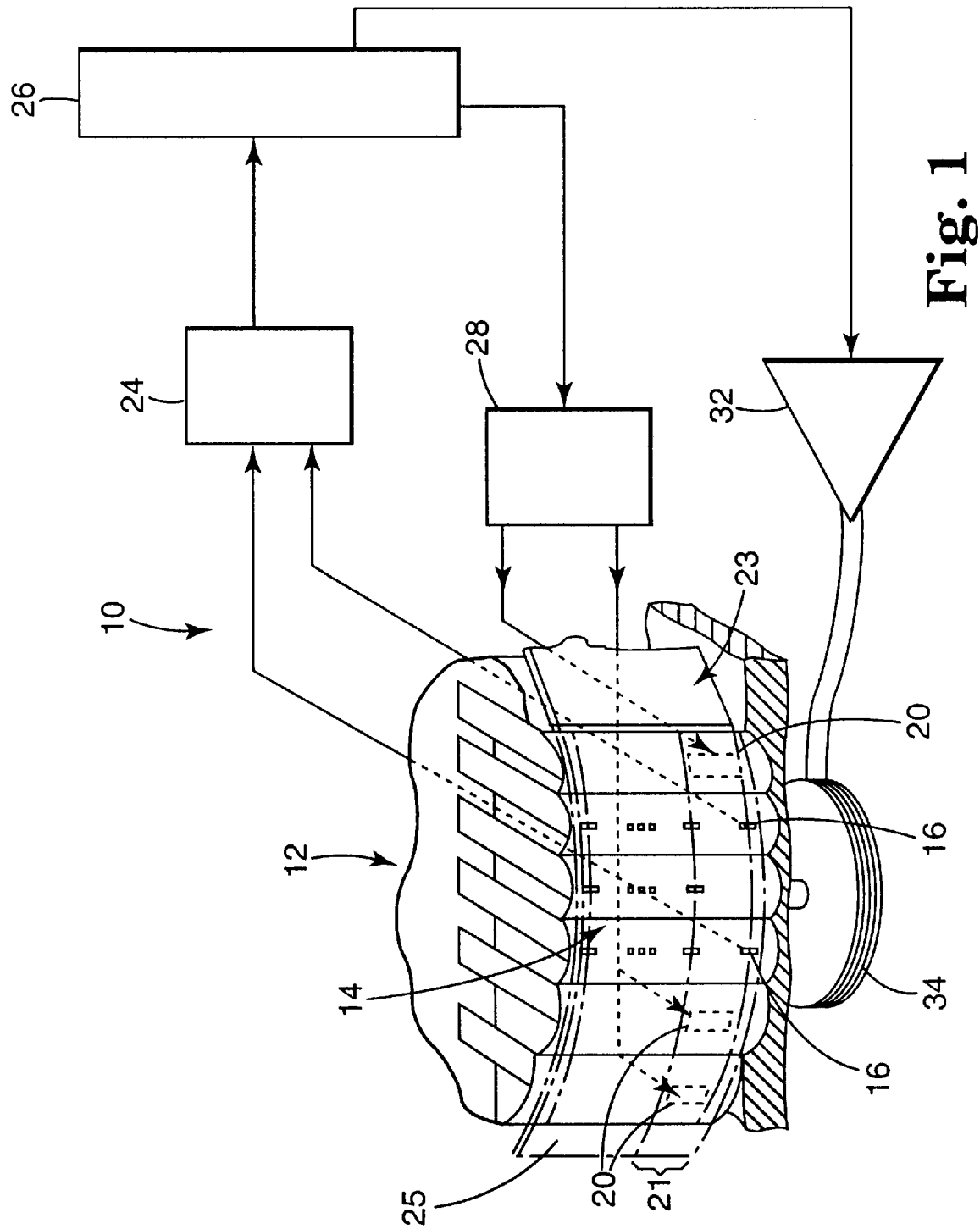
FIG. 1 is a schematic illustration of a tape servo tracking system in accordance with the present invention including a portion of a head assembly positioned relative to a tape having a servo band dedicated for servo information; the head assembly including generalized servo writer sections and one illustration of servo read and data read/write element sections.

As shown in FIG. 1, servo tracking system 10 includes head assembly 12, including servo writer sections 20, positioned relative to tape 23. Tape 23 includes servo band section 21 and data band section 25 across the width thereof. Servo writer sections 20 may include various servo writer elements for writing and encoding one or more servo tracks in servo band section 21 on magnetic tape 23. For example, the servo writer elements may include one or more servo write elements, one or more servo erase elements, and such elements may be provided along one or more gap lines of head assembly 12.

The head assembly 12 further includes one or more servo read elements 16 for use in reading encoded servo tracks to provide position signals and encoded information from the encoded servo tracks. The servo read elements 16 provide signals, representative of the position of the head assembly 12 relative to the tape 23, i.e., servo read elements relative to the servo track being read, and representative of encoded information, to servo read and decode circuitry 24. Head assembly 12 further includes data read/write elements 14 for reading and/or writing information from/to a plurality of data tracks in the data band section 25 of tape 23.

Servo read and decode circuitry 24 provides signals representative of the decoded information read from a servo track in servo band 21 to processing unit 26 as a function of the information encoded in the servo tracks. The decoded information is then interpreted by the processing unit and utilized as desired by the tracking system. Further, such servo information read from servo tracks which may be written and encoded utilizing servo write elements of servo writer sections 20 includes position signal information provided to servo read and decode circuitry 24, for use in generating a position error signal (PES). The servo read and decode circuitry 24 generates an output representative of a position of the servo read element or elements relative to a proximate servo track in the servo band 21 of the magnetic tape 23 being read for use by processing unit 26. The processing unit 26 generates a PES command based on the output of the servo read and decode circuitry 24. The servo write and decode circuitry 24 may include any circuitry, hardware and/or software, suitable for reading and decoding servo tracks as described further herein.

The head assembly 12 is positioned relative to tape 23 by repositioning actuator 34 in response to the PES command from processing unit 26 to position the head assembly 12 such that a desired alignment of the head assembly 12 relative to the magnetic tape 23 is achieved. The PES command is conditioned by conditioning circuitry 32, such as an amplifier, prior to application to positioning actuator 34. Such positioning aligns the servo read elements with respect to servo tracks within the servo band 21 and positions data read/write elements 14 for reading/writing data to/from data tracks within data band section 25 of tape 23.

The servo writer sections 20 for writing servo tracks and encoding the servo tracks in servo band 21 are controlled by servo write and encode circuitry 28 under control of processing unit 26. The servo write and encode circuitry 28 may include any circuitry, hardware and/or software, suitable for writing and encoding servo tracks as described further herein.

Generally, the servo tracking system 10 can employ various configurations of servo write elements, servo read elements, and data read/write elements. For example, servo write elements and servo read elements may be positioned along the same gap lines or along different gap lines as the data write/read elements. Various concepts described herein may be implemented with the use of multiple servo read elements as opposed to a single servo read element, and the servo read elements may be provided along the same or separate gap lines. Further, multiple servo read elements may be used for reading a single servo track, or the system may use center tapped servo read elements. Further, the head assembly may include only servo read elements without servo write elements (e.g., the servo tracks may be written and encoded at the factory). In addition, the head assembly may or may not include various erase elements (e.g., field servo writing of single frequency servo tracks in an erased servo band may only be possible on a pre-erased servo band). As such, the head assembly may be of various configurations as would be readily apparent to one skilled in the art. The present invention is not particularly concerned with the type of servo write elements and servo read elements utilized as long as they are suitable and configured for the encoding and decoding of servo tracks within a servo band of the tape as described herein. Also, such servo tracks encoded and decoded in accordance with the present invention may be written in the field with a head assembly including servo write elements or may be written in the factory. The present invention is not limited to field, or in situ, writing of the servo track configurations and encoding thereof.

Figure 2:
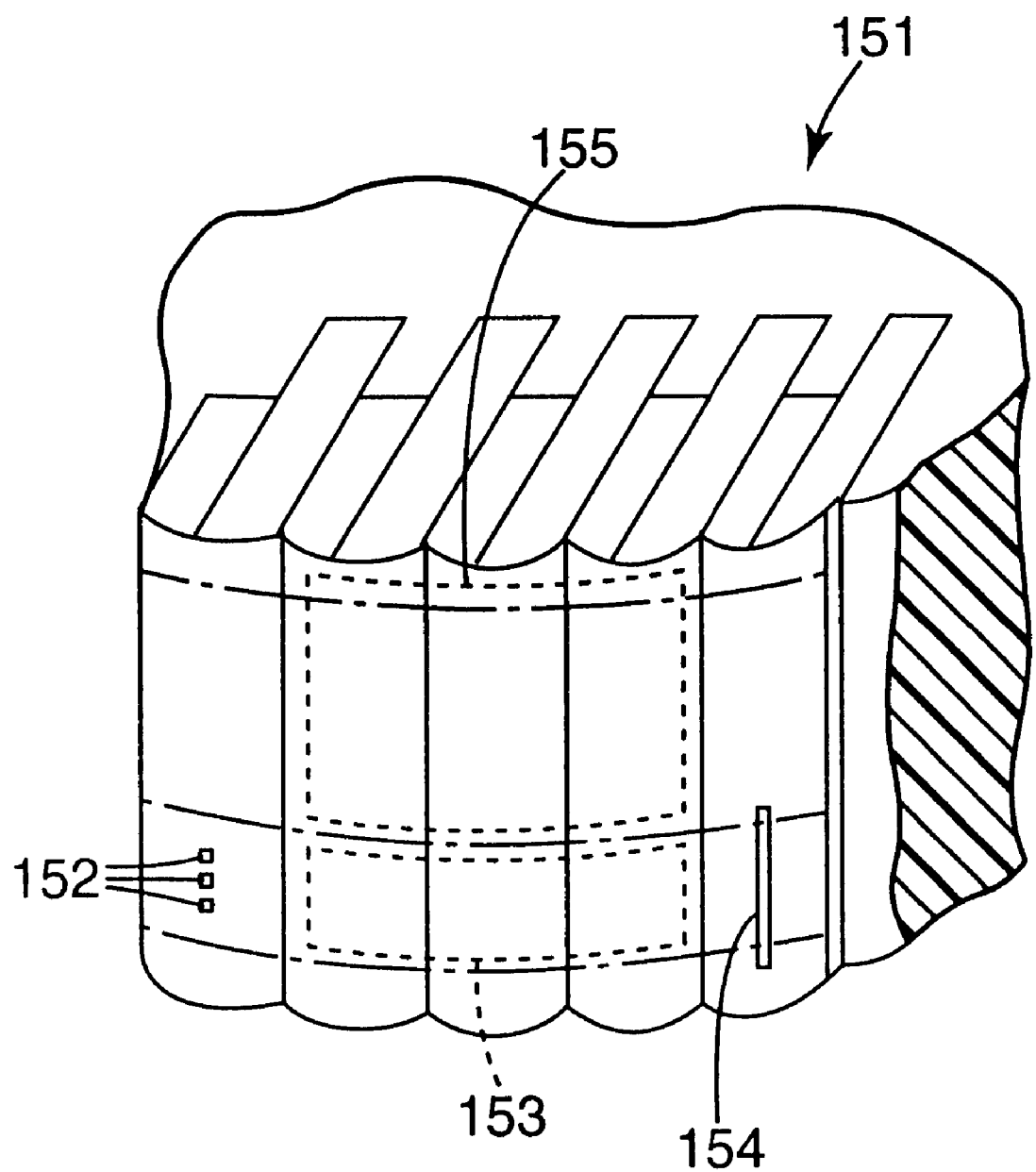
FIG. 2 is a perspective illustration of a portion of one head assembly configuration including servo writer elements in accordance with the present invention along with generalized servo read and data read/write element sections.
Figure 3:
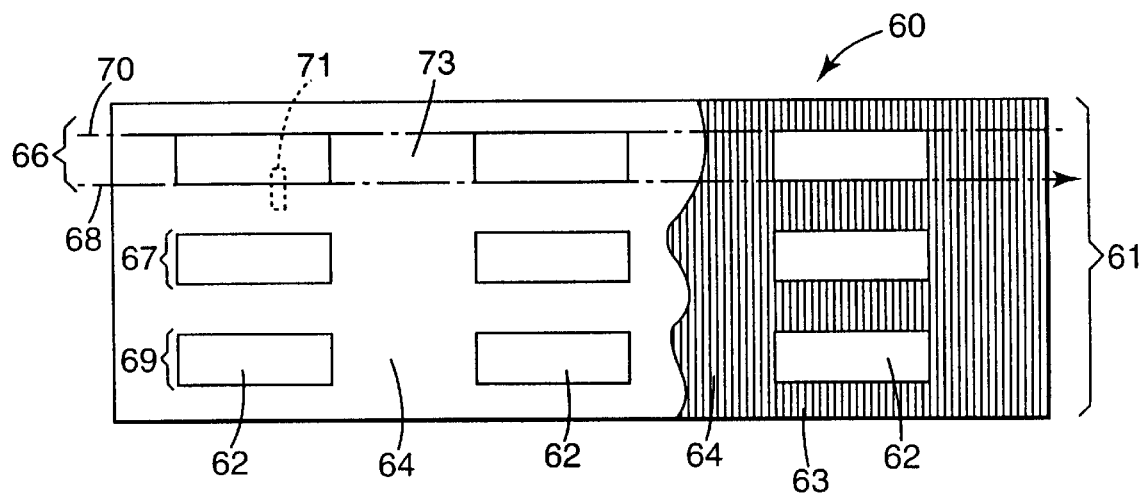
FIG. 3 is an illustration of a servo band including servo tracks provided by the erasure of portions of a servo carrier signal written substantially uniformly across a width of the servo band resulting in erased and non-erased portions of the servo band utilizing the servo writer elements of the head assembly of FIG. 2.

As shown in FIGS. 2–3 and described in detail in U.S. Pat. No. 5,229,895 to Schwarz et al., entitled "Multi-Track Servo Recording Head Assembly," a servo track configuration as shown therein is written utilizing a head assembly 151. Magnetic tape 60, including servo band 61 as shown in FIG. 3, passes along a transport path adjacent to head assembly 151 such that a servo carrier signal 63 is written across substantially the entire width of the servo band 61 by servo carrier write element 154. Portions of the servo carrier signal 63 are erased by the servo erase elements 152. The result is the servo track configuration as shown in FIG. 3, wherein periodic erased portions and non-erased portions of equal length are provided along three paths of predetermined width, i.e., servo track pitches, of the servo band 61. For example, erased portions 62 and non-erased portions 64 along the separated paths, e.g., path 73, are equal in length. The servo track configuration as shown in FIG. 3 includes pairs of servo tracks 66, 67, 69 defined in the separated paths by the periodic erased portions and non-erased portions. Each pair of servo tracks 66, 67, 69 provides servo track information for use in the reverse and forward transport of the tape 60. For example, servo track 70 of pair 66 formed by the erased and non-erased portions is for the forward direction movement of the tape and servo track 68 is for providing servo information when the tape is moving in the reverse direction. Therefore, if a servo track pair is unambiguously identified, and the reverse and forward direction of transport is known, each track is unambiguously identified.

The servo erase elements 152 erase portions 62 as shown in FIG. 3. The erasure may be provided by applying a high frequency signal to the servo erase elements 152. The frequency of the erased portions is much higher than is read by the system 10 and thereby the servo carrier signal 63 is erased. The servo erase elements 152 are switched on and off such that effective erasure occurs while the servo erase elements 152 are presented with an "on" signal. The result produced by the combined actions of the server carrier write element 154 and servo erase elements 152 is a servo configuration for tape 60 as shown in FIG. 3. It should be apparent to one skilled in the art that other erasure techniques producing such a result may be utilized and that the above method is for illustration only.

The servo configuration of tape 60 in servo band 61 defines the servo tracks which can then be read by servo read element 71 (FIG. 3). With the servo read element 71 positioned, e.g., centered over a given servo track, such as servo track 68, the resulting output signal of the servo read element 71 is a signal burst of full amplitude while over the recorded servo carrier signal 63 in the non-erased portions 64, followed by a half-amplitude signal burst while over the erased portion 62 in which the carrier 63 has been erased. So long as the respective centerline of the servo read element 71 is exactly centered over the respective edge of the erased portions 62, one-half of the gap of the read element 71 will see a written signal while the other half will not respond to the erased portions 62. The amplitude of the signal bursts from the read element 71 will thus be exactly 2 to 1 when the servo read element 71 is correctly positioned at the centerline of any of the respective servo tracks of servo track pairs 66, 67, and 69.

However, as the tape moves transversely to the head assembly, due to the undesirable effects of edge slitting tolerances, due to the tolerances of rotating components in the tape cartridge, or for any other reasons, the ratio of the amplitudes for the bursts will change, and thus, the read element 71 provides a position signal which represents position error to be used to reposition the magnetic head assembly 151 using a repositioning actuator such as that illustrated in FIG. 1. One system for reading such a servo pattern 60 as shown in FIG. 3 is described in more detail in U.S. Pat. No. 5,229,895, which is hereby incorporated in its entirety by reference thereto. However, the present invention is not limited to this particular illustrative example.

Figure 4A:
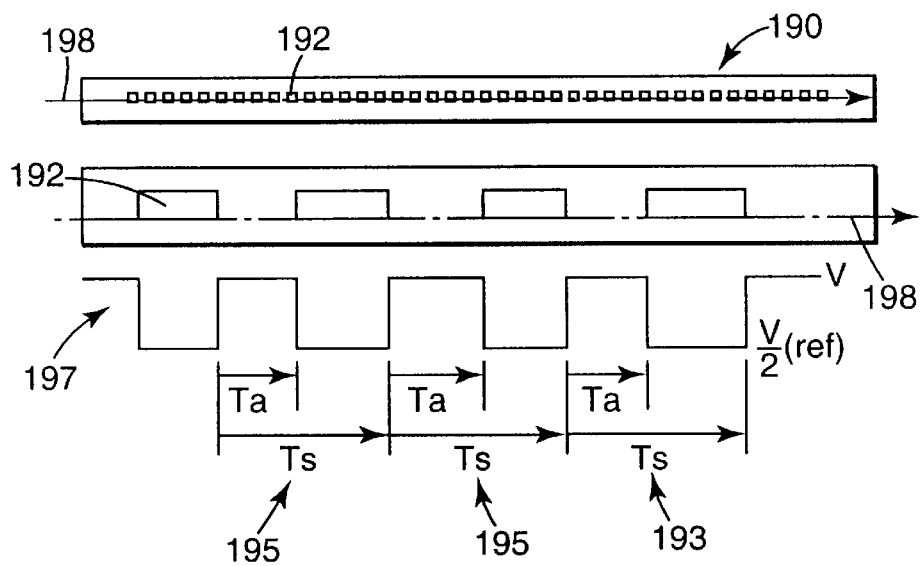
FIG. 4A is an illustration showing the timing associated with providing servo tracks as shown in FIG. 3 and further for use in illustrating the encoding of the servo tracks by varying the length of the erased portions.

In a manner similar to the way servo track pairs 66, 68, and 69 are provided by erasing portions of a servo carrier signal written substantially uniformly across the entire servo band as described above with reference to FIG. 3, servo tracks can be encoded with information with regard to characteristics of the tape of which the servo band is a part. Such encoding and decoding shall be described generally with reference to FIGS. 4–10. In FIG. 4A, one servo track centerline 198 indicated by the line and arrow at the lower edge of erased portions 192 of the portion 190 of a servo band is shown. Four erased portions 192 are shown in more detail with the centerline 198 of the servo track still being indicated by the line and arrow.

The lengths of the erased portions 192 are varied along the length of the tape to encode information thereon. Such encoding shall hereinafter be referred to as longitudinal encoding of the servo tracks. The information encoded may be representative of any characteristic of the tape with which the servo band is utilized, such as, for example, markers along the length of the tape, beginning of tape indicators, end of tape indicators, load indicators or any other location indication along the length of the tape. In particular, such encoded information may be indicative of tape locations along the length of the tape. In other words, an encoded servo track wherein the encoding is provided by varying the length of the erased portions 192 along the length of the tape can provide accurate tape location information which is independent of tape speed and does not require that data tracks be read. This is atypical of conventional data cartridge systems wherein tape locations are approximated by timing calculations using known tape speed and/or by periodically reading recorded data tracks and calculating tape locations. Such conventional methods limit the accuracy and speed of these systems in determining particular locations on the tape. Encoding of the servo tracks by varying the length of the erased portions as shown in FIG. 4A does not exhibit such disadvantages as the servo track, which is typically read anyway for providing PES information, now provides encoded information, such as, for example, tape location.

As shown in FIG. 4A, the manner in which the servo tracks are encoded and decoded is described in more detail. Signal 197 is representative of the servo waveform envelope recovered by a servo read element centered on centerline 198 of the servo track shown in servo band portion 190. As an example, given that Ts is equal to a constant servo sample period, that Ta is equal to a servo time period corresponding to the erased portions of a track pitch in the servo band, and that $\in$ is equal to a small unit of time wherein $0<\in<Ta$, then one can decode information from the servo track being read having erased portions of varying length. Further, for illustration, the following calculations can be utilized to determine the bit code, i.e. a one or a zero, represented by a length of the erased portions. For example, if $Ta<Ts/2-\in$, then a zero is decoded as shown in servo sample period 193.

However, if $Ta \geq Ts/2+\in$, then a one is decoded such as shown in the servo sample periods 195. It should be noted that $\in$ must be chosen such that there is no ambiguity between ones and zeros when decoded and further that there is no impact due to the variation of the length of the erased portions on the servo tracking system's ability to generate accurate position signal information. In this illustration, each servo sample period 193, 195 is decoded to provide a single bit. It should be readily apparent that various codes may be provided utilizing the varying of the length of the erased portions, for example, the varied portion lengths may be used to provide more than one bit of information, e.g., three different length ranges could be used to provide more than one bit.

Figure 4B:
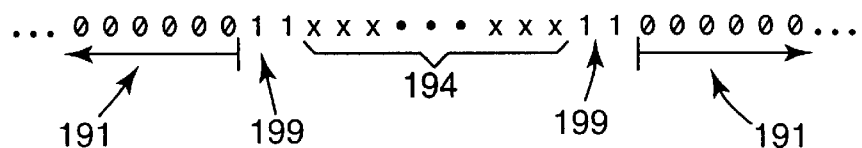
FIG. 4B is an illustration showing an N-bit location field encoded using servo track encoding such as shown in FIG. 4A.

Encoding and decoding of a servo track as described above in a longitudinal manner can provide tape location information or data representative of other tape characteristics. For example, by embedding bits in the servo track, bit patterns can be developed and utilized which encode tape locations along the length of the tape. Such a bit pattern is shown in FIG. 4B. The bit pattern can be repeated down the length of the servo track at intervals which will allow the decoding of precise location information. Such precise location information may be utilized for the positioning of data frames or for any other function desired.

As illustrated in FIG. 4B, the bit pattern may include a plurality of zeroes 191 between which an N-bit location field 194 is encoded. The zeroes 191 are set off from the N-bit location field 194 by synchronization bits 199. However, such synchronization bits 199 are not necessary for carrying out the present invention. The size of the N-bit location field 194, x x x . . . x x x, should be large enough to prevent the repeat of location codes along the total tape length of the tape in the tape cartridge. Given that Lp is equal to the length of a longitudinally addressable tape segment for a tape, that Lt is equal to the length of the tape in the cartridge, and that N is equal to the number of bits in the N-bit location field 194; then, the following calculations set forth the lower boundary for N: $N \geq CEILING[\log_2(Lt/Lp)]$. For example, if Lt/Lp is equal 9000 cm/0.5 cm, then $N \geq CEILING[\log_2(9000/0.5)]$ or 15 bits. Therefore, one could encode tape locations in a 16-bit location field without the repeat of location numbers along the total length of the tape in the data cartridge.

Figure 5A:
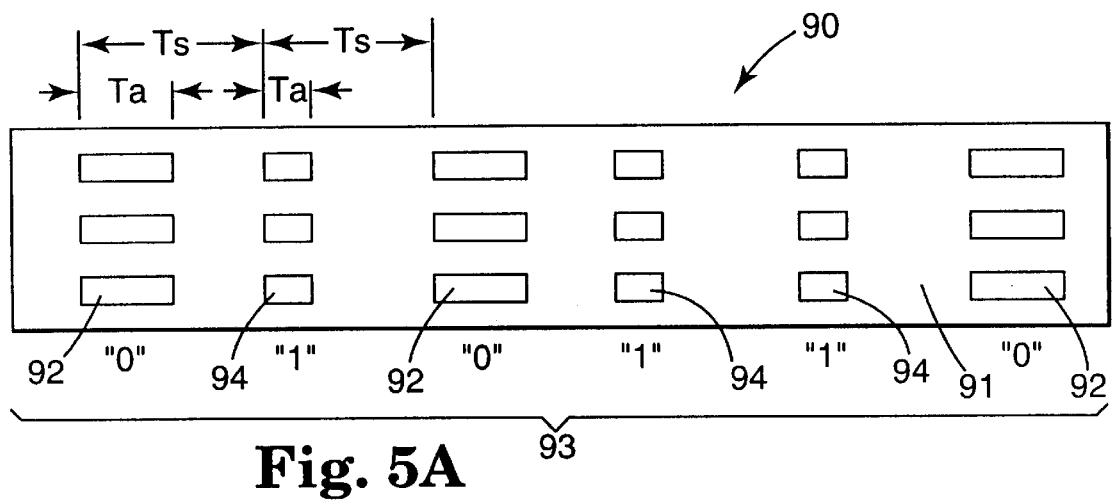
FIG. 5A is an illustration of a servo band including servo tracks longitudinally encoded for providing tape location information.

Another illustration of longitudinally encoding tape locations by varying the length of the erased portions in the servo carrier signal, such as with the utilization of the head assembly 151 of FIG. 2, is shown in FIG. 5A. In this illustration, the servo carrier signal 91, written utilizing servo carrier write element 154, includes longer erased portions 92 and shorter erased portions 94 along three track pitches running the length of the servo band 90 to form a bit pattern 93. The longer erased portions 92 represent zeroes and the shorter erased portions 94 represent ones. Bit pattern 93 is a 6-bit pattern. It should be readily apparent to one skilled in the art that the number of the bits in the pattern may vary (for example, the pattern may be 2 bit, 3 bit, 4 bit, etc.), that the lengths of the erased portions may vary, and further, that shorter erased portions 94 may be zeroes as opposed to ones and the longer erased portions 92 may be ones as opposed to zeroes. Further, more than two lengths may be used such that they can represent multiple values.

The varied length of the erased portions 92, 94 may be provided, for example, by presenting a varied on signal to the servo erase elements 152 during the periods in which the erased portions 92, 94 are to be erased. In other words, by varying the time that an "on" signal, e.g., a gated "on" signal, is presented to the servo erase elements 152 within a particular servo sample period, the length of the erased portions within the servo sample periods will be varied accordingly. As indicated previously, the length of such erased portions must be such that the generation of position signals utilizing the servo tracks in the servo band 90 is not affected by the encoding of information therein.

Figure 5B:
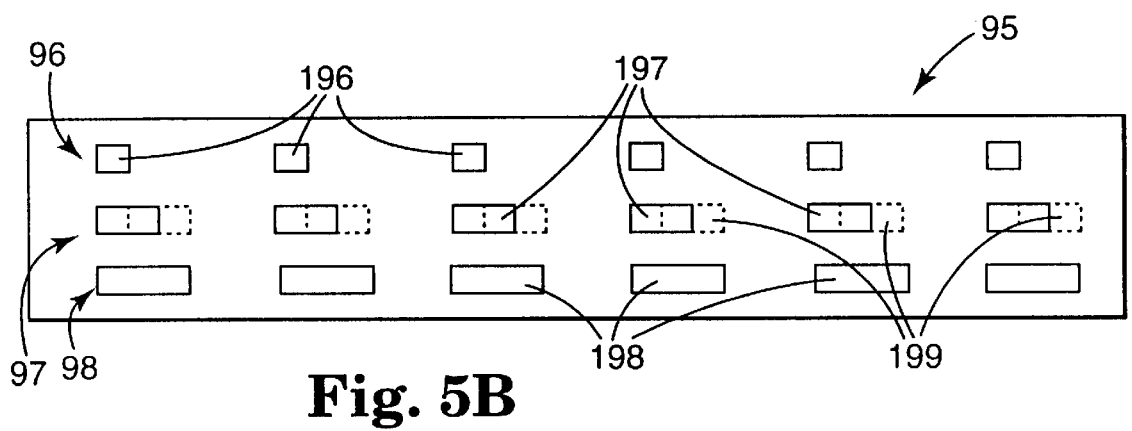
FIG. 5B is an illustration of a servo band including servo tracks transversely encoded for providing servo track identification.
Figure 7:
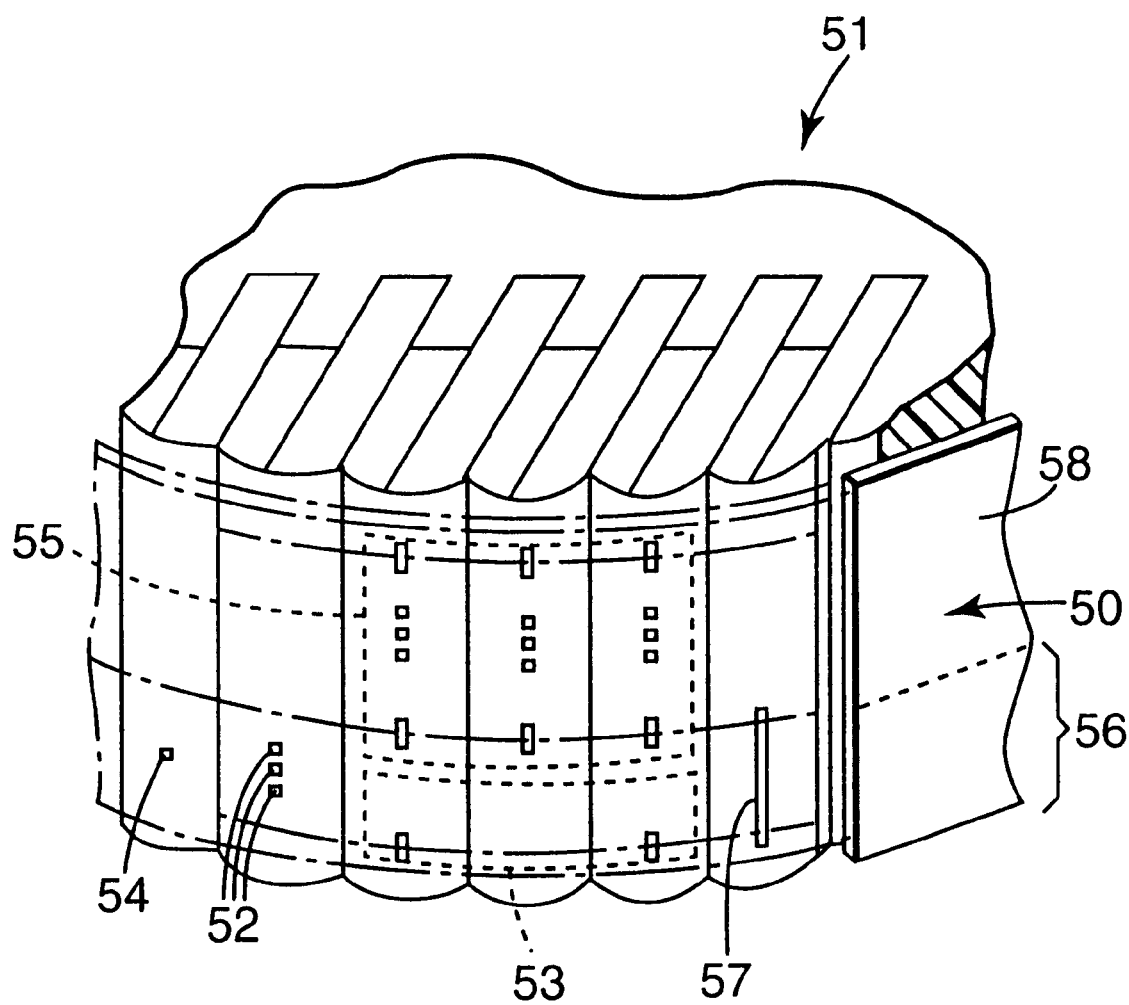
FIG. 7 is an illustration of another head assembly configuration showing servo writer elements in accordance with the present invention for providing encoded servo tracks as shown in FIG. 6 along with generalized servo read and data read/write element sections.

As opposed to the servo tracks being longitudinally encoded with information indicative of, for example, tape locations, such servo tracks may be encoded transversely, i.e., two or more separated servo tracks across the width of the servo band encoded differently from one another, as further shown in FIG. 5B. In such an encoded configuration, the length of one or more erased portions encoding a track pitch in the servo band varies across the width of the tape or servo band from one track pitch to another generally parallel track pitch. Hereinafter, such encoding is referred to as transverse encoding of the servo tracks. Transverse encoding may be performed utilizing a head assembly, such as head assembly 51 as shown in FIG. 7 described further below. Encoding each track pitch differently, i.e., in the transverse direction, allows for the servo tracks, e.g., pairs of servo tracks, to be uniquely identified so as to reduce any ambiguity as to which servo track is being read by the drive unit. For example, as mentioned in the Background of the Invention section, a loss of servo lock in the case of a sudden head displacement may result in the misidentification of the servo track presently being read. The transverse encoding approach is similar to longitudinal encoding of the servo tracks in that the transverse encoding is provided by varying the length of certain erased portions in a servo band. However, such lengths are varied from track to track when transverse encoding is utilized.

As shown in FIG. 5B, track pitches 96–98 are all encoded with erased portions 196–198 that are of different lengths. In this manner, each of the track pitches 96–98 can be unambiguously identified. Through decoding of the servo track pitches by determining the length of the erased portions anywhere along the length of the tape, the servo track pitch being read can be identified. Therefore, with knowledge of the reverse or forward direction of transport of the tape, the servo track of the servo track pair defined by the track pitch can be unambiguously identified. In such a configuration, it is unnecessary that the sample periods for the erased and non-erased portions of the track pitches have transitions that coincide, i.e., the sample periods may be offset as shown by the dashed offset erased portions 199. The decoding of the servo tracks may be performed in a like manner to that described above with respect to longitudinal encoding. However, in FIG. 5B, for illustration, the erased portions 196 may represent a "00" code, the erased portions 197 may represent a "01" code, and the erased portions 198 may represent a "11" code.

Figure 6:
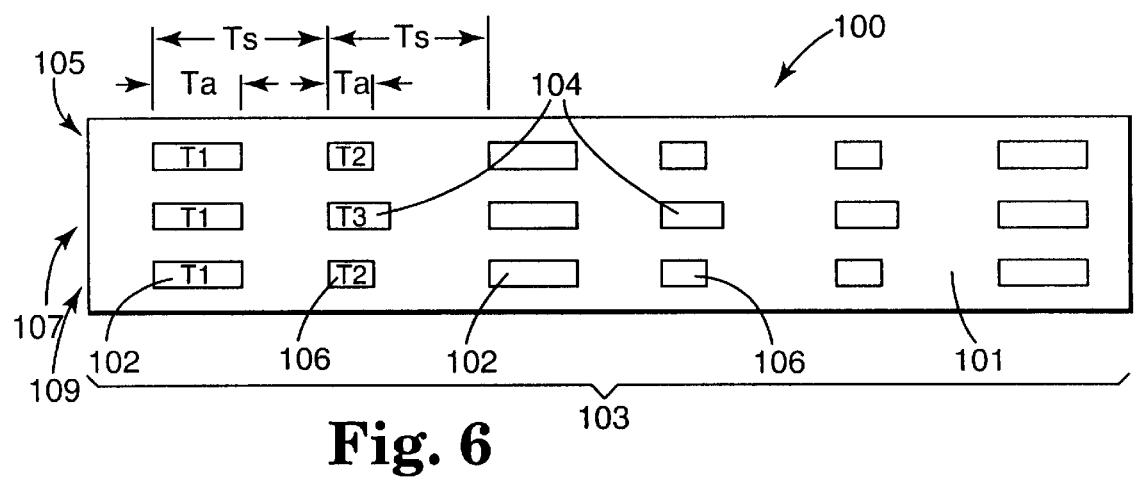
FIG. 6 is an illustration of a servo band including servo tracks longitudinally encoded for providing information with regard to tape locations along the length of the tape and also transversely encoded for providing information with regard to servo track identification.

An example of a servo configuration wherein both longitudinal and transverse encoding is utilized is shown in FIG. 6. It should be readily apparent that various illustrations of such longitudinal and transverse encoding, both individually or in combination are possible, and that the present illustrations given are to be in no manner taken as limitations to the present invention defined by the accompanying claims. As shown in FIG. 6, for example, varying the length of the erased portions is utilized in the following manner. In a servo band with three periodically erased servo track pitches (e.g., three pairs of servo tracks), given that Ts is the constant servo sample period and that Ta is a servo time corresponding to the erased portions along the track pitches of the servo band, then one can decode data from the servo track being read using the following calculations. For example, for tape location purposes, if Ta≧Ts/2 then the erased portion is representative of a one. If Ta<Ts/2 then for tape location purposes, the erased portion is representative of a zero. In other words, just like as described with reference to FIG. 5A, unique location codes 103 can be encoded using a series of ones and zeros as desired, e.g., such as in location fields. As illustrated in FIG. 6, within track pitch 105, a 101001 code is shown.

Further, as illustrated in FIG. 6, for servo track pair identification coded by a two bit code, if Ta<Ts/3 for erased portions representative of zeroes for purposes of longitudinal encoding, then the erased portion is representative of a code of 01 for servo track pair identification as shown by erased portions 106. If Ts/3<Ta<Ts/2, then the erased portion is decoded as a code of 11, such as shown by erased portion 104. Some tolerances may be added to or subtracted from Ts/3 and/or Ts/2 in the above calculation due to small variability in the lengths of the erased portions. Therefore, as illustrated in FIG. 6, the servo track pair provided for by the erased and non-erased portions of track pitch 105 of the servo band 100 is identified as a decoded 01 whereas the servo track pair of track pitch 107 as provided by the erased portions and non-erased portions is identified as 11 which is unique from the servo track pair of track pitch 105. The servo track pair of track pitch 109 is identified by a decoded 01. The servo track pair of track pitch 109 may be identified by a different code than servo track pair of track pitch 105. Complete ambiguity with respect to servo track identification is only possible by providing a unique code for each of the servo track pairs of track pitches 105, 107, 109.

One skilled in the art will recognize that the number of codes are substantially unlimited for use in providing unique codes for various purposes. The length of the erased portions are, however, limited to lengths so as to not affect the generation of position information while still allowing sufficient distinction from length to length in order to allow the length differences in the erased portions to be detected. Further, it should be readily apparent to one skilled in the art that transverse encoding and longitudinal encoding may be utilized either in combination or separately.

FIG. 7 is an illustration of one embodiment of a head assembly 51 positioned relative to a tape 50 for servo writing and encoding servo tracks in accordance with the present invention. Tape 50 includes a servo band 56 and one or more data bands 58. Although not shown, it should be readily apparent to one skilled in the art that the servo band may be positioned at one edge of the tape 50 or at the other edge of tape 50 or anywhere therebetween. Preferably, in many circumstances, having the servo band centered between data tracks is advantageous to reduce error. Such error is typically due to the increased distance between data tracks and the servo band 56 since the tape related track displacement between the servo track and the data track due to environmental factors and shrinking is directly related to the separation distance between the servo element and data element.

The longitudinal encoding and transverse encoding can be provided when writing the servo tracks with the head assembly 51 as illustrated in FIG. 7. The head assembly 51 is very similar to the head assembly as shown in FIG. 2 with the addition of servo erase element 54 along a separate gap line of the head assembly. The elements along each gap line have a common coil. The head assembly 51 includes a servo carrier write element 57 for writing a substantially uniform servo carrier signal across a predetermined width of the servo band 56 of tape 50. Servo erase elements 52 are then utilized to erase portions of the servo carrier signal written in the servo band 56 along three separated track pitches to define servo track pairs encoded with information, e.g., tape location information. Servo erase element 54 is aligned and positioned relative to the center erase element of servo erase elements 52 such that the length of the erased portions of the center path can be varied for encoding servo tracks with information regarding servo track identification.

The head assembly 51 further includes servo read element section 53 including, for example, one or more servo read elements. In addition, the head assembly 51 includes data read/write section 55 which includes, for example, one or more data read/write elements for reading and writing from/to data tracks within one or more data bands 58 of tape 50.

The servo writer elements, shown illustratively in FIG. 7, are shown in closer relation to one another in the illustration of FIG. 8A. The servo writer elements may be, for example, thin film or ferrite servo writer elements. The servo writer includes servo carrier write element 57 for writing the servo carrier frequency in a predetermined width of the servo band. The set of servo erase elements 52 for erasing portions of the servo carrier signal are aligned and separated to provide erased and non-erased portions, such as illustrated in FIG. 6 (longitudinal encoding). Further, the servo writer includes erase element 54 for erasing a further portion extended from a portion erased by one of the servo erase elements of set 52 such that the erased portion is of a longer length than the portions erased by the set 52. For example, the center servo erase element of set 52 of servo erase elements and servo erase element 54 are utilized to extend the erased portion, such as erased portion 104, as shown in FIG. 6. The erase element 54 must be aligned along the same path as the center erase element of set 52 so as to allow the lengthening of the erased portions in that path.

It should be apparent to one skilled in the art that the additional erase elements within a separate gap line may be needed since each element conventionally cannot be controlled individually, i.e., the elements in the gap lines have a common coil. However, if technology allows for the individual control of the elements within the same gap line then multiple gap lines would be unnecessary.

Another alternative configuration of elements for servo writing is shown in FIG. 8B. The servo writer includes servo carrier write element 357 for writing the servo carrier frequency in a predetermined width of the servo band. The set of servo erase elements 352 for erasing portions of the servo carrier signal written in the predetermined track pitch width are aligned and separated to provide erased and non-erased portions within two track pitches, such as track pitches 105 and 109 as illustrated in FIG. 6. Further, the servo writer includes erase element 354 for providing additional erased and non-erased portions within another track pitch, such as track pitch 107 as illustrated in FIG. 6. By utilizing a separate erase element 354 as shown in FIG. 8B to provide erased portions of a length different than erased portions provided using erase elements 352 (as opposed to an element that is aligned with an erase element of another gap line, e.g., elements 54 and 52), alignment problems are avoided with equivalent results.

FIG. 9A provides a general illustration of multiple configurations for a servo writer 80 which provide for erasing portions in various separated paths across the servo band width after a servo carrier signal is written by servo carrier write element 82. Such multiple configurations are generally represented by the arrow 84 which indicates that any number of servo erase elements in the transverse direction may be utilized, and likewise, any number of erase elements in the longitudinal direction may be used as generally represented by arrow 86. As shown specifically by FIG. 9A, four erase elements are shown in the transverse direction with multiple erase elements shown in the longitudinal direction such that each of the four servo track pairs defined by erased and non-erased portions in the servo band can be identified by a unique length of the erased portions. For example, the length of erased portions of the upper servo track pair will be of a greater length than the others as provided by the greater number of erase elements aligned in the longitudinal direction. The specific illustration shown in FIG. 8A is one of the many configurations generally represented by FIG. 9A.

FIG. 9B provides another general illustration of multiple configurations for a servo writer 380 which provide for erasing multiple portions in various separated paths across the servo band width after a servo carrier signal is written by servo carrier write element 382. Such multiple configurations are generally represented by the arrow 384 which indicates that any number of servo erase elements in the transverse direction may be utilized, and likewise, any number of erase elements in the longitudinal direction may be used as generally represented by arrow 386. As shown specifically by FIG. 9B, one erase element is utilized in each of four gap lines for individual control of the length of the erased portions within the separated paths such that each of the four servo track pairs defined by erased and non-erased portions in the servo band can be identified by a unique length of the erased portions. As represented by the alternative dashed line element 381, more than one element may have a common coil and fall in the same gap line. However, in such a case, such erase elements having a common coil could be used for longitudinal encoding but would not provide a uniquely identified servo track pair. The specific illustration shown in FIG. 8B is one of the many configurations generally represented by FIG. 9B.

Figure 10:
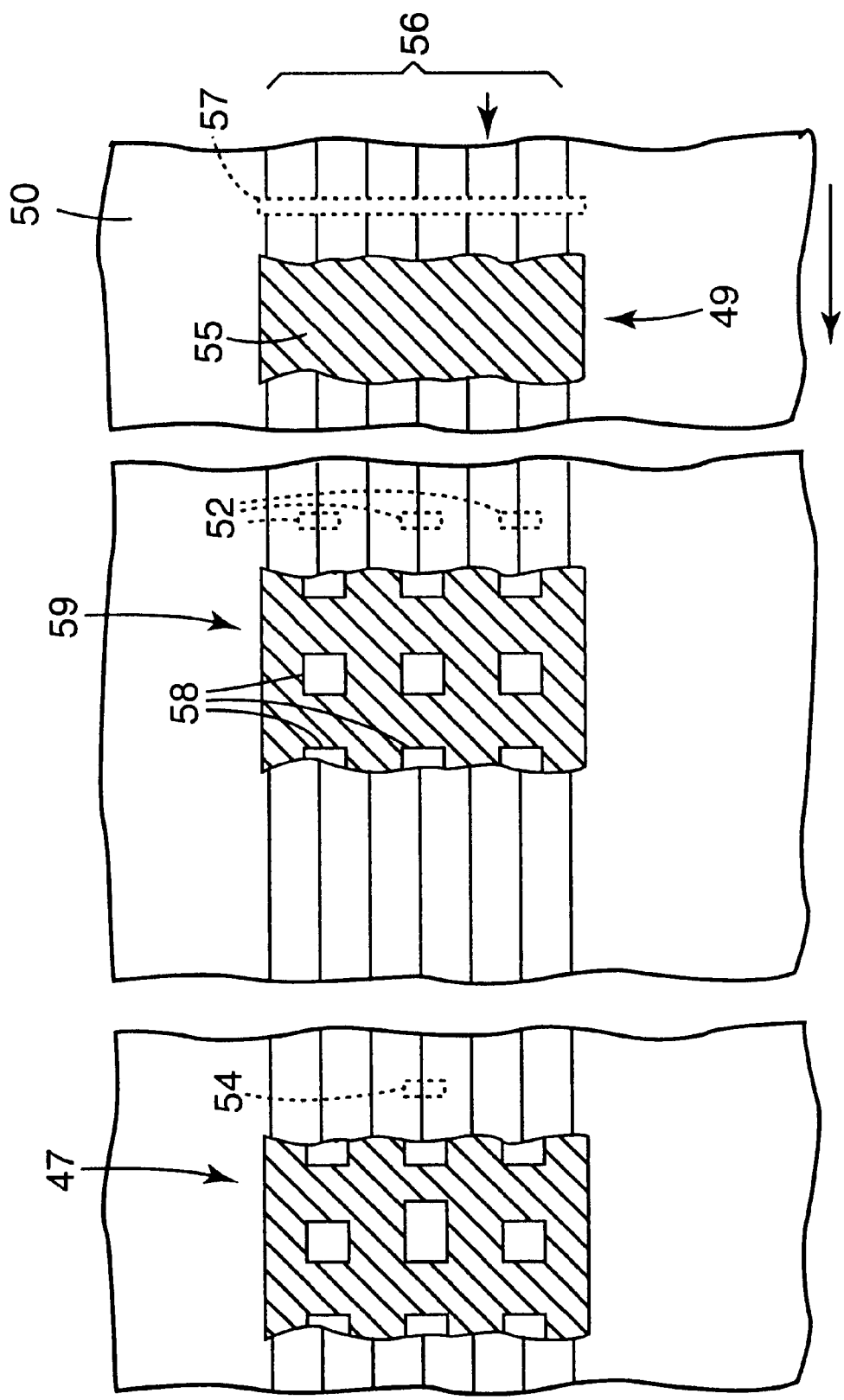
FIG. 10 is an illustration of one embodiment of writing and encoding servo tracks in accordance with the present invention utilizing the servo writer elements of FIG. 8A.

One example of the longitudinal and transverse encoding of servo tracks in accordance with the present invention is illustrated using the illustrative head assembly 51 as shown in FIG. 7 and servo write elements of FIG. 8A for writing servo tracks in a servo band 56 of tape 50 (FIG. 10). As shown in FIG. 10, servo carrier write element 57 writes a single frequency servo carrier signal 55 in a predetermined width within the servo band 56. The element 57 is preferably energized with a high frequency drive signal so as to uniformly record the servo carrier signal 55 throughout the width of the servo band. Subsequently, as the tape 50 moves from right to left as indicated by the arrow in FIG. 10, the written servo carrier signal 55 passes the set of servo switched erase elements 52 which erase portions of respective paths from the previously continuously recorded servo carrier signal 55. These erased portions correspond to the width of each of the servo erase elements of the set 52 and are erased along separated paths of the servo band, respectively. The resulting pattern is shown by the tape servo band section 59. Then, as the tape is further moved from right to left, an on signal is applied to servo erase element 54 to extend the length of the erased portion of the center path as desired. The resulting servo track configuration is shown in section 47 of the tape servo band 56 and is substantially similar to the servo track configuration as shown in FIG. 6.

An alternative embodiment for providing the encoding indicative of servo track identification is shown in FIG. 11. The erased and non-erased portions 126, 128 are provided in a manner like that described with reference to FIG. 3. Three paths of erased and non-erased portions are provided along the length of the tape as represented by path 130, path 132, and path 134 in servo band 122. These paths, i.e., track pitches, are created as previously indicated by a servo carrier write element for writing a servo carrier signal 124 and servo erase elements for providing the erased portions 126 and non-erased portion 128 within the servo band 122 of tape 120.

To identify each of the servo track pairs defined by the paths 130, 132, and 134, portions of each of the paths are encoded at different frequencies. For example, portions corresponding to the previously erased portions in path 130 are encoded with frequency 131, portions corresponding to previously erased portions in path 132 are encoded with frequency 133, and portions corresponding to previously erased portions within path 134 are encoded with frequency 135. The servo tracks defined in the paths are still available for generating position signals. With the use of the different encoding frequencies in the paths 130, 132, and 134, servo track pair identification is encoded and can also be decoded therefrom. The frequency of the desired servo track pair is filtered out from a preamplified signal generated by a read element positioned relative to a servo track being read. This assures that only one valid servo track signal is recognized and that no others, i.e., of different frequency, are recognized. It should be readily apparent that the encoding of the track pitches, i.e., paths, with different frequencies such as in FIG. 11, may be utilized in combination with longitudinal encoding as illustrated herein.

A further alternative embodiment of a servo track configuration in accordance with the present invention is shown in FIG. 12. In this servo track configuration, several of the erased portions are dropped out as shown by reference number 146 whereas the other erased portions 144 are erased from the servo carrier signal 141 in servo band 142. In this matter, servo track pairs in servo band 142 can be identified by a dropout pattern which is unique for each path along the length of the tape 140. This pattern 143 can be repeated along the length of the tape. In FIG. 12, a pattern of -no dropouts- identifies servo tracks provided by paths 145 and 149 while a pattern of -dropout/erased section/ dropout/erase section/erase section- identifies path 147 and the servo tracks provided thereby.

Figure 13:
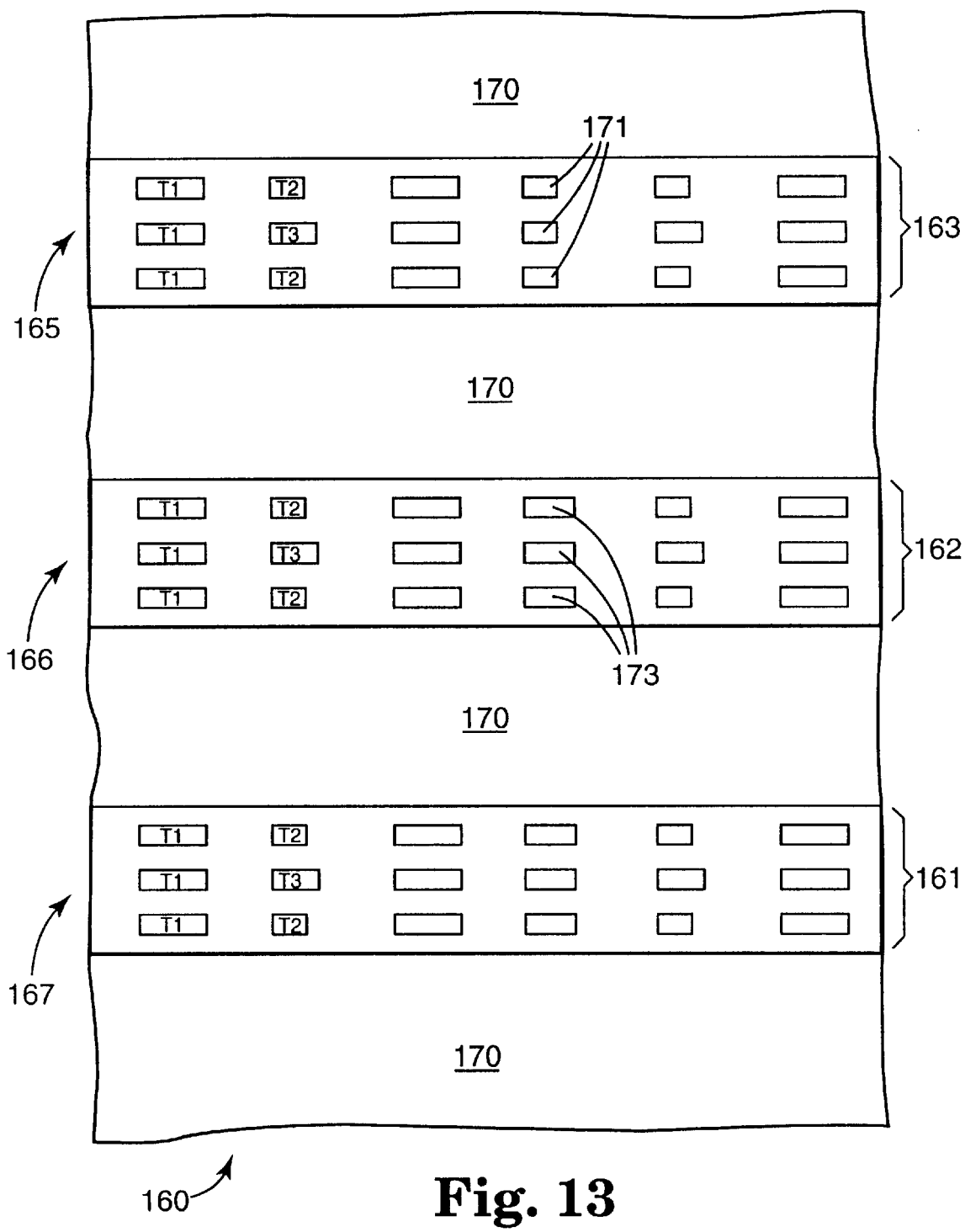
FIG. 13 shows a tape including multiple servo bands encoded in accordance with the present invention for providing information regarding servo band identification.

A tape 160 including a plurality of servo bands 161, 162, and 163 is shown in FIG. 13. The servo bands 161–163 are separated by data bands 170. The servo bands 161–163 may be encoded using unlike codes such that the servo band itself can be identified uniquely from the other servo bands. For example, servo band 163 is encoded transversely by the servo track configuration 165 as opposed to servo track configuration 166 which is encoded in a different manner than servo track 165 as indicated by the different lengths of erased portions 171 and 173. It should be readily apparent that any number of the erased portions may have varied lengths from one servo band to another to uniquely identify the servo bands, i.e., provide a unique servo band code. In the illustrative FIG. 13, servo bands 161 and 162 are coded equivalently. However, these two servo bands may also be encoded such that they are uniquely identified relative to one another.

Likewise, different tapes may be encoded in unique manners such that the encoding scheme can be utilized to represent whether it is one tape format or another. For example, a tape may include a servo band such as servo band 163 encoded according to configuration 165 and a separate tape may include a servo band such as 162 encoded in a manner such as shown by the servo track configuration 166.

Figure 14:
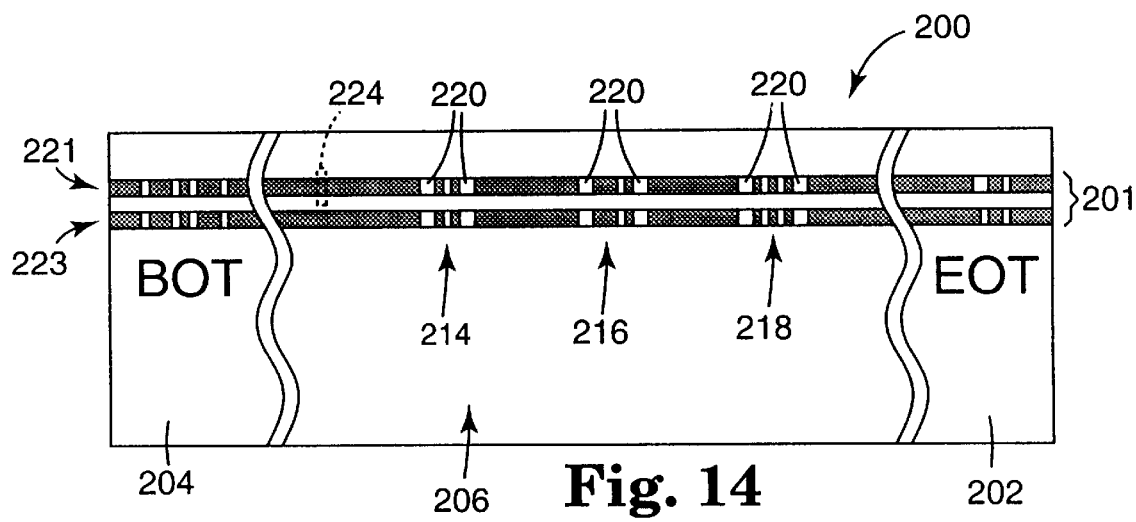
FIG. 14 shows an alternative servo band and servo track configuration utilizing separated single frequency servo tracks read utilizing at least one pair of servo read elements and including encoded blocks for providing information regarding characteristics of the tape.

Alternative techniques for writing servo tracks and reading servo tracks are also available as shown by the alternative techniques illustrated by FIGS. 14–17. Encoding of information into such servo tracks is also contemplated in accordance with the present invention. In such configurations, a servo band 201 of tape 200 is written with separated, i.e., noncontiguous, single frequency servo tracks 221 and 223 recorded in a continuously erased width along the entire length of the tape. Such servo tracks, which may vary in number, may be written in situ or at the factory. A center tapped element 224 is utilized to provide a position signal to center the tapped element 224 over one of the separated servo tracks 221 and 223 as is generally known in the art. Further, any number of multiple servo read element configurations may be used for reading a single frequency servo track such as servo track 221 and the present invention is not limited to any particular configuration. As shown in FIG. 14, the servo tracks 221 and 223 may be encoded at BOT with information indicating that the servo read element 224 is at BOT and also the servo band may encoded at EOT such that the servo read element 224 generates signals representative that the servo read element 224 is at EOT.

Just as encoding is utilized to encode information with regard to servo track identification and tape locations along the tape as described previously with reference to FIGS. 1–13, the single frequency servo tracks 221 and 223 may be encoded for providing the like or same information such as tape locations, loading point, etc. The encoding concept with respect to the single frequency servo tracks as shown in FIG. 14 includes embedding information regarding a tape characteristic, servo track identification, tape location, or other information, in a single frequency, i.e., constant transition density servo track. Such encoding is performed by either modulating the signal within short blocks of encoded block lengths in either phase (FIG. 16) or frequency (FIG. 17). These modulated short blocks then represent 1's and 0's which may be encoded by leaving alternating short blocks unmodulated (or vice versa). For example, a "0" is represented by using an unmodulated short block between two unmodulated areas and a "1" would be represented by using a modulated short block between two unmodulated areas.

FIG. 14 is one illustration of an example of an encoded servo track of tape 200 in accordance with the alternative encoding technique using short modulated blocks within encoded block lengths to provide the desired information. In the illustration of FIG. 14, the two noncontiguous or separated servo tracks are shown with identical encoding except for the EOT region 202. As one skilled in the art would recognize, the number of servo tracks may be one or more for this illustration and every other illustration of the invention as described herein. If more than one servo track is utilized, such multiple servo tracks may have the same encoding or different encoding as shall be described with reference to FIG. 15.

As shown in FIG. 14, the wider bands 220 represent the start and finish of the encoded block lengths 214, 216, and 218. Each of the encoded block lengths 214, 216, and 218 as shown in FIG. 14 are identified by the wider modulated blocks 220, i.e., wider than the modulated short blocks therebetween, and include a different binary count. For example, reading from left to right, the first encoded block length 214 is encoded with a binary count of 1, the encoded block length 216 is encoded with a binary count of 2, and encoded block length 218 is encoded with a binary count of 3. As such, in this particular example, the simple binary count 1-2-3, may be used to mark tape locations.

Obviously, as would be known to those skilled in the art, various other codes could be utilized and provided in a like manner. For example, each encoded block length may be encoded with a varying number of bits as between the various block lengths, each block length may be coded with one or more bits, or any other combination or code can be utilized. Further, for example, the code may be indicative of markers of the tape to be interpreted by the processor controlling the servo system to determine the tape locations from the markers, such as with the use of a counter. This method would be in contrast to the use of the codes to provide absolute tape locations.

Typically, the encoded servo tracks would carry a code periodically at a uniform distance along the length of tape 200, i.e., for example, every 20–30 cm. The block lengths 214, 216, and 218 shown in FIG. 14 are shown much larger in scale relative to their separation.

Figure 15:
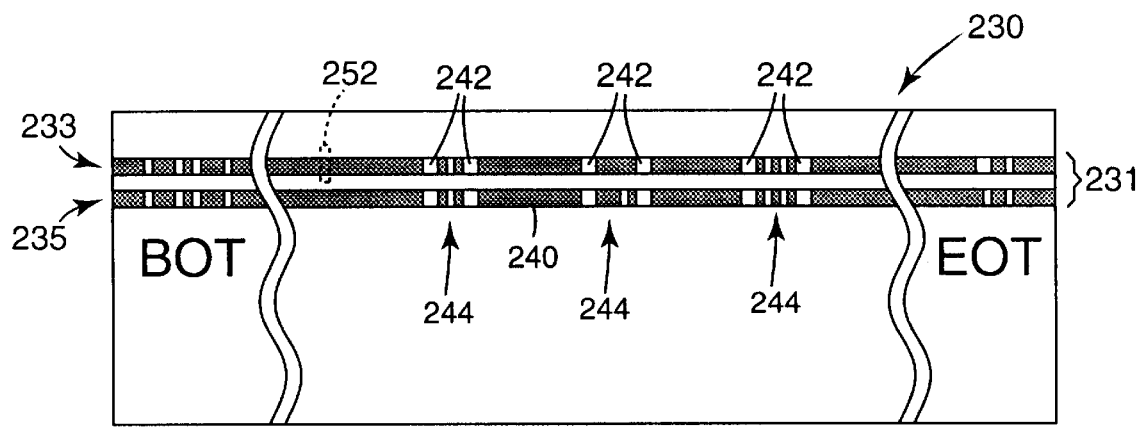
FIG. 15 is an alternative encoded configuration of the servo band and servo track configuration of FIG. 14 in accordance with the present invention.

As shown in FIG. 15, the servo tracks in servo band 231 of tape 230 are provided with encoded block lengths 244 set apart by start and finish bands 242 that are encoded differently from one servo track 233 to the other servo track 235. For example, servo track 233 is encoded with a code of "103" and servo track 235 is encoded with a code of "123." In this manner, the servo tracks 233, 235 can be unambiguously identified.

Figure 16:
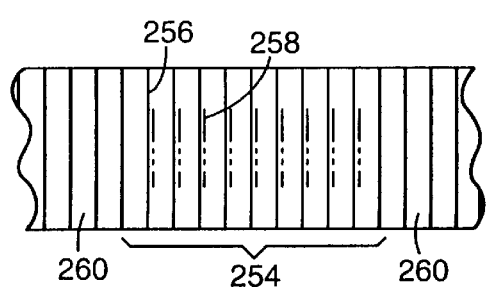
FIG. 16 is a more detailed illustration of the method of encoding the encoded blocks of the single frequency servo tracks of FIGS. 14 and 15.
Figure 17:
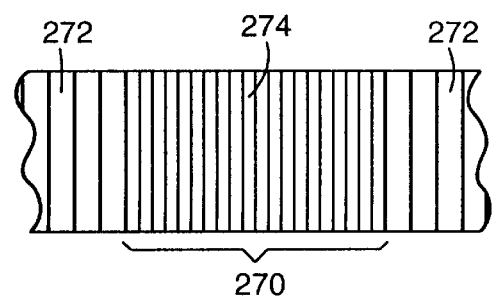
FIG. 17 is a more detailed illustration of an alternative method of encoding the encoded blocks of the single frequency tracks as shown in FIGS. 14 and 15.

An enlarged view of the two types of short blocks utilized in the encoded block lengths and modulated in either phase or frequency is shown in FIGS. 16 and 17. In FIG. 16, the signal in the block is phase encoded. The servo carrier transitions are shown by the lines 260. The phase encoded lines are shown as lighter lines 256 across the servo track. The dashed lines 258 at track center show where the servo carrier transitions would have been written if they were not encoded.

In the illustration of FIG. 16, the short block 254 is about ten transitions. This number of transitions is for illustrative purposes only and either less or more transitions may be utilized to define the short block. For example, a short block of 500 transitions may occupy a very short length.

As shown in FIG. 17, frequency can also be used to modulate the short blocks. The encoded frequency 274 in the short block 270 is double the servo carrier frequency 272. However, any difference in frequency capable of being detected may be utilized in accordance with this technique.

Both encoding patterns can easily be detected by a typical phase locked loop, which is used in the data detection channel to "clock" data for tape and/or disk systems. The phase locked loop's main components include a phase detector (comparator), a frequency discriminator, a filter, and a voltage controlled oscillator. The phase detector has two inputs, the signal, i.e., the servo signal, which has been amplified and truncated to form a train of pulses whose width and timing are coherent with the analog servo signal, and the square wave output of the voltage controlled oscillator. The input servo signal and the oscillator output signal are compared in the phase detector and a phase error output voltage that is proportional to the difference between the input servo signal and the oscillator output is generated. This low bandwidth, nearly d.c., phase error signal is filtered and used to drive the voltage controlled oscillator which adjusts its frequency to compensate and be in synchronization with the input signal. When a shift in transitions is present, the initial edge of the phase error signal is detected as a one. In a similar manner, the frequency discriminator portion of the phase locked loop will produce an output voltage when a difference between the input servo signal frequency and the voltage controlled oscillator frequency is detected as long as neither is an exact multiple of the other.

Although the present invention has been described with particular reference to various embodiments thereof, variations and modifications of the present invention can be made within a contemplated scope of the following claims as is readily known to one skilled in the art.

What is claimed is:

1. A servo tracking data recording tape, the tape comprising a plurality of bands of tracks along the length of the tape, the plurality of bands of tracks including at least one data band having a plurality of data tracks and a servo band dedicated for servo information, wherein the servo band includes substantially uniformly written servo carrier information across a predetermined servo carrier width along the length of the tape with at least one encoded track pitch defined therein, each encoded track pitch having alternating erased and non-erased portions along the length of the tape for defining at least one servo track, the alternating erased and non-erased portions of the at least one encoded track pitch include encoded information representative of at least one characteristic of the tape, and further wherein the encoded information is provided by varying the length of one or more of the erased portions and one or more of the non-erased portions.

2. The tape according to claim 1, wherein the encoded information is representative of tape locations along the length of the tape.

3. The tape according to claim 2, wherein the length of a plurality of the erased portions and a plurality of the non-erased portions in the at least one encoded track pitch is varied along the length of the tape to represent unique location codes representative of the tape locations along the length of the tape.

4. The tape according to claim 3, wherein at least one pair of servo tracks defined by the at least one encoded track pitch is encoded by the varied lengths of the erased portions and non-erased portions representing the unique location codes.

5. The tape according to claim 3, wherein the plurality of the erased portions and non-erased portions of the at least one encoded track pitch are varied within location fields along the length of the tape, each location field representing one tape location, and further wherein the location fields having a predetermined number of bits such that repetition of a unique location code is prevented.

6. The tape according to claim 3, wherein the servo band includes two or more encoded track pitches defined in the substantially uniformly written servo carrier information, each encoded track pitch defining a corresponding pair of servo tracks, and further wherein the alternating erased and non-erased portions of each of the two or more encoded track pitches include encoded information uniquely identifying each corresponding pair of servo tracks.

7. The tape according to claim 3, wherein the servo band includes two or more encoded track pitches defined in the substantially uniformly written servo carrier information, each encoded track pitch defining a corresponding pair of servo tracks, and further wherein at least part of the erased portions of one or more of the erased portions in each of the encoded track pitches is encoded with a signal having a frequency that is different relative to a frequency used to encode at least part of the erased portions of one or more of the erased portions in one of the other encoded track pitches such that the different frequencies used to encode the parts of the erased portions uniquely identify the corresponding pairs of servo tracks.

8. The tape according to claim 1, wherein the servo band includes two or more encoded track pitches defined in the substantially uniformly written servo carrier information, each encoded track pitch defining a corresponding pair of servo tracks, and further wherein the alternating erased and non-erased portions of each of the two or more encoded track pitches include encoded information uniquely identifying each corresponding pair of servo tracks.

9. The tape according to claim 8, wherein the pairs of servo tracks are uniquely identified by the encoded information along substantially the entire length of the tape.

10. The tape according to claim 8, wherein the two or more encoded track pitches are transversely encoded by varying the length of one or more of the erased portions in one of the two or more encoded track pitches relative to the length of one or more of the erased portions of another of the two or more encoded track pitches to uniquely identifying each pair of servo tracks with a unique identification code.

11. The tape according to claim 8, wherein the alternating erased and non-erased portions include encoded information representative of tape locations along the length of the tape.

12. The tape according to claim 11, wherein the tape locations are longitudinally encoded by varying the length of the erased portions and non-erased portions of at least one of the two or more encoded track pitches representing unique location codes for locations along the length of the tape.

13. The tape according to claim 1, wherein the servo band includes substantially uniformly written servo carrier information across a predetermined servo carrier width along the length of the tape with two or more encoded track pitches defined therein, each encoded track pitch having alternating erased and non-erased portions along the length of the tape defining a corresponding pair of servo tracks extending along the length of the tape, and further wherein each pair of servo tracks is uniquely identified by transversely encoding the encoded track pitch such that each encoded track pitch has one or more erased portions with lengths that vary relative to the erased portions of the other two or more encoded track pitches such that each encoded track pitch is represented by unique identification codes, and yet further wherein the tape locations are uniquely identified by longitudinally encoding at least one encoded track pitch by varying the length of the erased portions of the encoded track pitch along the length of the tape such that the varied lengths of the erased portions represent unique location codes for locations along the length of the tape.

14. The tape according to claim 1, wherein the tape is part of one type of a plurality of different types of tape cartridges, wherein at least one servo band of the tape of each of the plurality of different types of tape cartridges includes one or more of the erased portions having a varied length relative to one or more of the erased portions of servo bands of other types of tape cartridges such that each different type of tape cartridge is uniquely identified.

15. The tape according to claim 1, wherein the tape has a plurality of servo bands, each servo band of the tape including one or more of the erased portions having a varied length relative to one or more of the erased portions of one or more of the other servo bands such that each servo band of the plurality of servo bands is uniquely identified.

16. The tape according to claim 1, wherein each erased and subsequent non-erased portions of the alternating erased and non-erased portions falls within a predetermined time period, and further wherein the at least two servo tracks are uniquely identified by a pattern of missing erased portions within one or more of the predetermined time periods.

17. A system for writing servo track information within a servo band of a tape, the system comprising:

a servo write transducer along a first gap line for writing a servo carrier signal extending substantially uniformly over a servo carrier width of a servo band of a tape;

at least one servo erase element of predetermined width along a second gap line for erasing portions of the servo carrier signal to provide alternating erased portions and non-erased portions along an encoded track pitch within the servo carrier width along the length of the tape to define at least one servo track extending along the length of the tape within the servo carrier width, wherein the at least one servo erase element is controlled to vary the length of the erased portions and non-erased portions to provide encoded information representative of at least one characteristic of the tape.

18. The system according to claim 17, wherein the encoded information is representative of tape locations along the length of the tape.

19. The system according to claim 17, wherein the system further includes one or more additional servo erase elements of predetermined width along a third gap line for erasing additional portions of the servo carrier signal to provide alternating erased portions and non-erased portions along an additional encoded track pitch generally parallel to the encoded track pitch including the alternating erased portions and non-erased portions erased by the at least one servo erase element along the second gap line, and further wherein the one or more additional servo erase elements along the third gap line are controlled to vary the length of the erased portions relative to the erased portions erased by the at least one servo erase element along the second gap line so as to provide encoded information uniquely identifying the encoded track pitches.

20. The system according to claim 19, wherein one or more of the servo erase elements along the second or third gap lines are controlled for varying the length of the erased portions along the length of the tape for providing encoded information representative of tape locations along the length of the tape.

21. The system according to claim 17,
wherein the system includes two or more servo erase elements separated along the second gap line, each of the two or more servo erase elements for erasing portions of the servo carrier signal to provide alternating erased portions and non-erased portions along corresponding and generally parallel encoded track pitches within the servo carrier width along the length of the tape; and
wherein the system further includes one or more additional servo erase elements along a third gap line, the one or more additional servo erase elements being controlled so as to provide an additional erased portion extending from one or more of the erased portions along the corresponding paths within the servo carrier width so as vary the length of the erased portions of the corresponding paths to provide encoded information uniquely identifying each of the encoded track pitches.

22. The system according to claim 21, wherein one or more of the servo erase elements along the second or third gap lines are controlled for varying the length of the erased portions along the length of the tape for providing encoded information representative of tape locations along the length of the tape.

23. An encoding method for use in a servo tracking system, the method comprising the steps of:

providing a tape comprising a plurality of bands of tracks, the plurality of bands of tracks including at least one data band having a plurality of data tracks and a servo band dedicated for servo information;

substantially uniformly writing servo carrier information across a predetermined servo carrier width along the length of the tape;

erasing portions of the servo carrier information written across the predetermined servo carrier width in at least one encoded track pitch within the servo carrier width resulting in alternating erased and non-erased portions along the length of the tape defining at least one servo track pair; and encoding the servo tracks with information representative of at least one characteristic of the tape by varying the length of one or more of the erased portions and one or more of the non-erased portions of the at least one encoded track pitch.

24. The method according to claim 23, wherein the erasing step includes erasing portions of the servo carrier information written across the predetermined servo carrier width in two or more encoded track pitches within the servo carrier width resulting in alternating erased and non-erased portions along the length of the tape defining at least two servo track pairs, one or more of the erased portions and non-erased portions of the two or more encoded track pitches being varied in length so as to uniquely identify the at least two servo tracks pairs.

25. The method according to claim 24, wherein the at least two servo track pairs are uniquely identified by encoding the two or more encoded track pitches such that each encoded track pitch includes varied lengths of the erased portions relative to the lengths of the erased portions of other encoded track pitches allowing each servo track pair to be represented by a unique identification code.

26. The method according to claim 25, wherein the erased and non-erased portions of at least one of the two or more encoded track pitches include encoded information representative of tape locations along the length of the tape, the tape locations being uniquely identified by longitudinally encoding the at least two servo tracks by varying the length of the erased portions such that the varied lengths of the erased portions represent unique location codes for tape locations along the length of the tape.

27. The method according to claim 23, wherein the varied lengths of the erased portions and non-erased portions include encoded information representative of tape locations along the length of the tape.

28. The method according to claim 27, wherein the lengths of a plurality of the erased portions in the at least one encoded track pitch are varied along the length of the tape such that the varied lengths of the erased portions represent unique location codes representative of the tape locations along the length of the tape.

29. The method according to claim 28, wherein the lengths of the erased portions of the at least one encoded track pitch is varied within location fields along the length of the tape, each location field representing one tape location, the location fields having a predetermined number of bits such that repetition of a unique code is prevented.

* * * * *